United States Patent
Shah et al.

(10) Patent No.: US 10,733,383 B1
(45) Date of Patent: Aug. 4, 2020

(54) FAST ENTITY LINKING IN NOISY TEXT ENVIRONMENTS

(71) Applicant: Workday, Inc., Pleasanton, CA (US)

(72) Inventors: Samir Mavji Shah, San Francisco, CA (US); Michael David Conover, San Francisco, CA (US); Peter Nicholas Skomoroch, San Francisco, CA (US); Matthew Terence Hayes, Milpitas, CA (US); Scott Mitchell Blackburn, Menlo Park, CA (US)

(73) Assignee: Workday, Inc., Pleasanton, CA (US)

( * ) Notice: Subject to any disclaimer, the term of this patent is extended or adjusted under 35 U.S.C. 154(b) by 159 days.

(21) Appl. No.: 15/989,074

(22) Filed: May 24, 2018

(51) Int. Cl.
*G06F 40/00* (2020.01)
*G06F 40/30* (2020.01)
*G06F 16/35* (2019.01)
*G06F 40/216* (2020.01)
*G06F 40/284* (2020.01)

(52) U.S. Cl.
CPC .............. *G06F 40/30* (2020.01); *G06F 16/35* (2019.01); *G06F 40/216* (2020.01); *G06F 40/284* (2020.01)

(58) Field of Classification Search
CPC combination set(s) only.
See application file for complete search history.

(56) References Cited

U.S. PATENT DOCUMENTS

| | | | |
|---|---|---|---|
| 8,766,827 B1* | 7/2014 | Milne | H03M 7/3084 341/51 |
| 10,417,350 B1* | 9/2019 | Mohamed | G06F 17/2827 |
| 2013/0268260 A1* | 10/2013 | Lundberg | G06F 17/28 704/8 |
| 2017/0124181 A1* | 5/2017 | Nauze | G06F 16/2468 |
| 2017/0351951 A1* | 12/2017 | Santos | G06N 3/08 |
| 2018/0268317 A1* | 9/2018 | Dharwadker | G06F 16/9535 |
| 2018/0349347 A1* | 12/2018 | Ringger | G06Q 50/01 |

* cited by examiner

*Primary Examiner* — Vu B Hang
(74) *Attorney, Agent, or Firm* — Van Pelt, Yi & James LLP

(57) ABSTRACT

A system for disambiguation of noisy text includes an interface and processor. The interface is configured to receive a set of words. The processor is configured to determine a token from the set of words, wherein the token includes a subset of the set of words; determine candidates for the token; determine a ranking for the candidates based at least in part on a semantic similarity between the token and each of the candidates; determine whether to select a top ranked candidate or to abstain; and in response to a select determination to select the top ranked candidate, indicate the top ranked candidate is selected.

19 Claims, 13 Drawing Sheets

FAST ENTITY LINKING IN NOISY TEXT ENVIRONMENTS

BACKGROUND OF THE INVENTION

Linking text within a document to a reference or entity is a useful feature that helps a user understand elements of any given document. Also important is that the linking provides structure that enables downstream applications and algorithms to compute over previously unstructured text in a more effective way. For example, if a search engine is to be built, knowing that a document refers to Python the snake, as opposed to the programming language, is helpful and will significantly improve the product experience. For scaling purposes, a process automatically analyzes texts, selects a set of text elements from a text environment, and links each text element to a reference or entity. The entity comprises a concept associated with a definition—for instance, a dictionary, knowledge base, or encyclopedia entry. In a text environment with cleanly defined context—for example a newspaper or journal article—linking a text element to an entity is straightforward. The article context can be used to disambiguate between multiple possible entities associated with the text element. However, in noisy environments, a global article context is not easily determined. A local context could change every sentence or even change within a sentence. For example, when a text conversation (e.g., chat) between company employees is analyzed, the employees may discuss multiple subjects with different contexts in the same conversation. This creates a problem where automatically disambiguating between multiple possible entities to link with a text element is very difficult.

BRIEF DESCRIPTION OF THE DRAWINGS

Various embodiments of the invention are disclosed in the following detailed description and the accompanying drawings.

DETAILED DESCRIPTION

Figure 1:
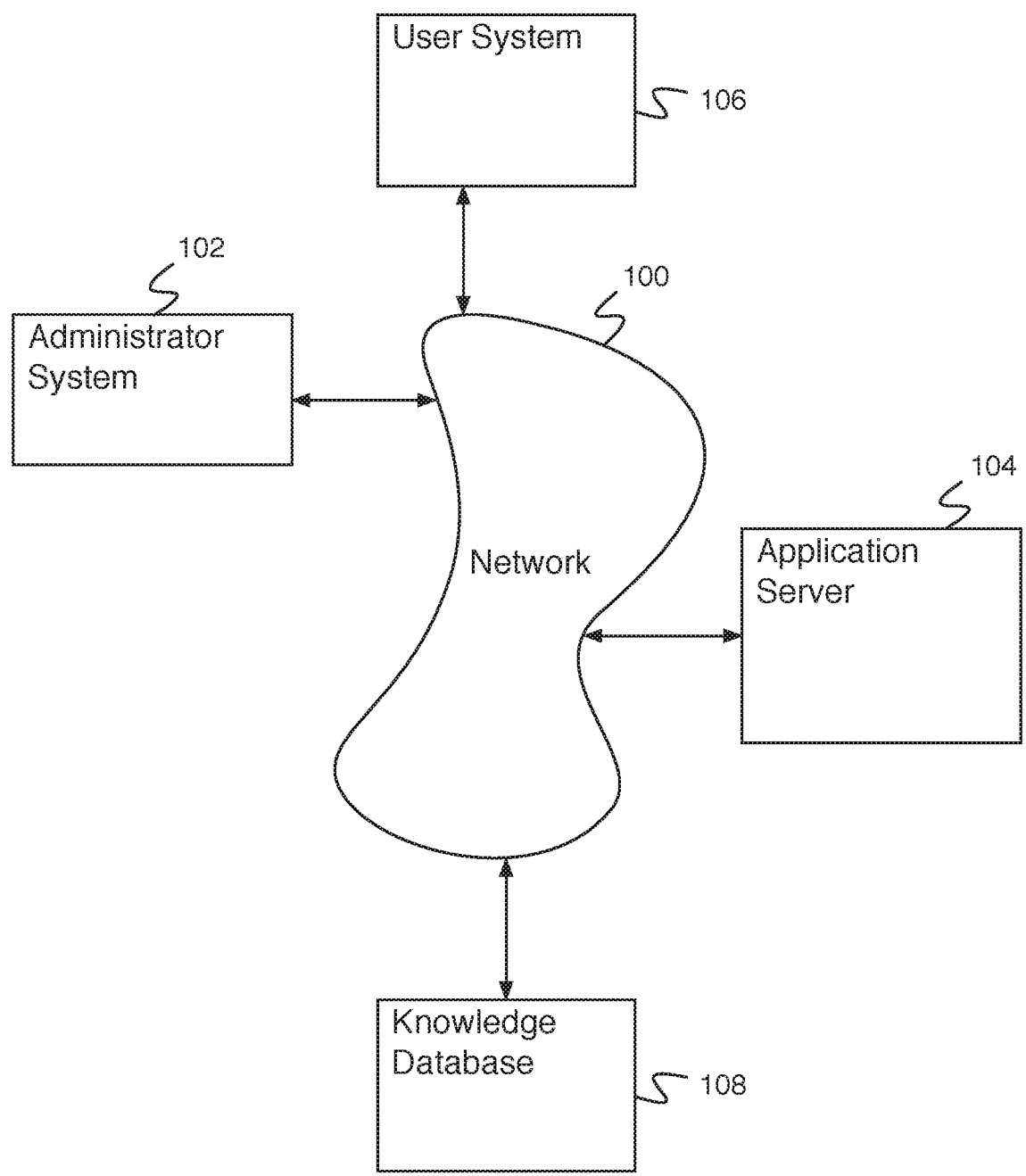
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for disambiguation of noisy text comprises an interface configured to receive a set of words, and a processor configured to determine a token from the set of words, wherein the token includes a subset of the set of words, determine candidates for the token, determine a ranking for the candidates based at least in part on a semantic similarity between the token and each of the candidates, determine whether to select a top ranked candidate or to abstain, and in response to a select determination to select the top ranked candidate, indicate the top ranked candidate is selected.

A system for disambiguation of noisy text comprises a system for linking a text element in a noisy text environment with an entity. An entity comprises a conceptual entity associated with a specific definition. For example, an entity comprises an entry in a database, a knowledge database, a dictionary, an encyclopedia, a knowledge graph, a wiki, Wikipedia, a private jargon database, etc. The system receives a set of words and determines a token from the set of words.

The token comprises a text element that is to be linked with an entity. In some embodiments, tokens are determined for a plurality of words of the set of words or all words of the set of words. Each token is associated with one or more words. In some embodiments, a tokenizing algorithm (e.g., a parallel, probabilistic algorithm or a Named Entity Recognition algorithm such as those powered by conditional random fields, etc.) determines a set of tokens comprising the set of words, wherein each token comprises one or more contiguous words of the set of words. Tokens are chosen such that each token is associated with a single concept.

The system then determines a set of candidates (e.g., a set of knowledge base candidates) for the token. Each candidate of the set of candidates comprises an entity that could be associated with the token. The set of candidates is determined from a candidate dictionary—for example, a dictionary comprising a set of candidates associated with each of a set of tokens. In some embodiments, the candidate dictionary is determined by performing a tokenizing algorithm on each entry of an encyclopedia set of entries (e.g., a specialized database, a client specific wiki, Wikipedia entries, hyperlinks from web crawls into a database (like Crunchbase or Wikipedia), etc.) and determining linked tokens (e.g., tokens associated with linked words in the entry). In some embodiments, the candidate dictionary is determined by using the hyperlinks on a Wikipedia page, or a Common Crawl page to identify surface forms (the hyperlink anchor text) that point to a specific page. Each time a linked token is identified, the entity to which the token is linked is associated with the token in the candidate dictionary. Entries identified to be linked with a token across the encyclopedia set of entries comprise the set of candidates associated with the token.

A ranking for the candidates is then determined based at least in part on a measure of the similarity between the semantic context in which the token appears and the target candidate. It is the local window around the token in conjunction with the semantic clusters that are doing the work of measuring semantic similarity. Semantic clusters are created by grouping similar text across many, many documents, and creating a statistical profile of the frequency and proximity (or co-occurrence) of all the themes in those documents. For example, the semantic similarity between the token and a candidate of the set of candidates is based at least in part on one or more nearby words to token words in the set of words. Clusters of semantic meaning are determined from the set of words. Each word of the set of words is associated with a vector in a multidimensional vector space. A clustering algorithm is used to identify semantically similar words in the vector space and to identify disjoint clusters indicating semantically distinct groups of words. Each cluster produced by the clustering algorithm is associated with a local context that can be used to assist with determining a ranking for the candidates. In various embodiments, the ranking for the candidates is additionally based on popularity, anchor text probabilities, morphology, string similarity, or on any other appropriate data. Data based on the semantic similarity and any other appropriate data are input to a candidate ranking machine learning algorithm and a candidate ranking is determined by the candidate ranking machine learning algorithm. The candidate ranking machine learning algorithm additionally determines a confidence value associated with each candidate. This provides structure that enables downstream applications and algorithms to compute over previously unstructured text in a more effective way. For example, search engines, knowing that a document refers to Python the snake, as opposed to the programming language, is helpful and will significantly improve search engine performance.

A determination is then made whether to select the top ranked candidate or to abstain. The determination is based on the confidence values associated with the candidates. In various embodiments, the determination is made by determining whether the confidence value associated with the top ranked candidate is greater than a threshold, by determining whether the difference between the confidence value associated with the top ranked candidate and the confidence value associated with the second ranked candidate is greater than a threshold, using a machine learning algorithm, or in any other appropriate way. In the event a select determination is made to select the top ranked candidate, the system indicates that the top ranked candidate is selected. In the event an abstain determination is made to not select the top ranked candidate, the system indicates that no candidate is selected.

The system described makes the computer better by enabling linking less-structured text (e.g., chats as opposed to finished written documents) to include linking to references or entities. This enables user to have access to appropriate associated information that supplements, explains, or provides context to the less-structured texts. The linking is determined automatically by the system so that a user does not have to provide appropriate linking. Interpretation of less-structured texts is complex even for humans as several streams of differently related content can be intertwined. This potentially makes the entity or reference linking even more relevant to provide contextual or related information to the supplied text.

FIG. 1 is a block diagram illustrating an embodiment of a network system. In some embodiments, the network system of FIG. 1 comprises a network system for a system for disambiguation of noisy text. In the example shown, user system 106 accesses applications on application server 104. For example, user system 106 accesses database system applications, data processing applications, design applications, communications applications, etc. Applications are executed remotely (e.g., on application server 104) or locally (e.g., on user system 106).

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, application server 104, user system 106, and knowledge database 108 communicate via network 100. Administrator system 102 comprises an administrator system for use by an administrator. Administrator system 102 comprises an administrator system for executing administrator commands, for configuring application server 104, etc. Application server 104 comprises an application server for providing user access to applications. User system 106 comprises a user system for use by users. A user uses user system 106 to interact with application server 104—for example to request delivery of application data, to request execution of an application, to query whether an application is available, to query a current application version, to chat with a coworker, etc. A user additionally uses user system 106 to communicate with other users using other user systems (e.g., using a communications application). User system 106 comprises a set of user system applications for execution using a processor. For example, a user system comprises a communications application, a chat application, a web browser application, a document preparation application, a data analysis application, etc.

An entity linking application for analyzing text is executed either using user system 106 or application server 104. The entity linking application comprises an application for determining a token from the set of words, wherein the token includes a subset of the set of words, determining candidates for the token, determining a ranking for the candidates based at least in part on a measure of the similarity between the semantic context in which the token appears and the target candidate, determining whether to select a top ranked candidate or to abstain, and in response to a select determination to select the top ranked candidate, indicating the top ranked candidate is selected.

Knowledge database 108 comprises a knowledge database for storing a set of knowledge. In various embodiments, knowledge database 108 comprises an online encyclopedia, a jargon database, a company specific database, a dictionary, a knowledge graph, a wiki, Wikipedia, a private jargon database, or any other appropriate database. Knowledge database 108 comprises a set of knowledge articles defining a set of concepts. In some embodiments, knowledge database 108 does not necessarily include a set of articles; instead knowledge database 108 includes integers describing specific entities or metadata about entities. For example, 'Barack Obama' could be an entity and there is not any text associated with that entry, just relationships and facts like "Age" and "Birthplace." In some embodiments, knowledge database 108 comprises a knowledge graph. Knowledge articles in knowledge database 108 comprise definitional links to other knowledge articles in knowledge database 108 (e.g., for defining terms used in a definition of a concept). In some embodiments, a local copy of some or all of knowledge database is stored by user system 106 or by application server 104.

Figure 2A:
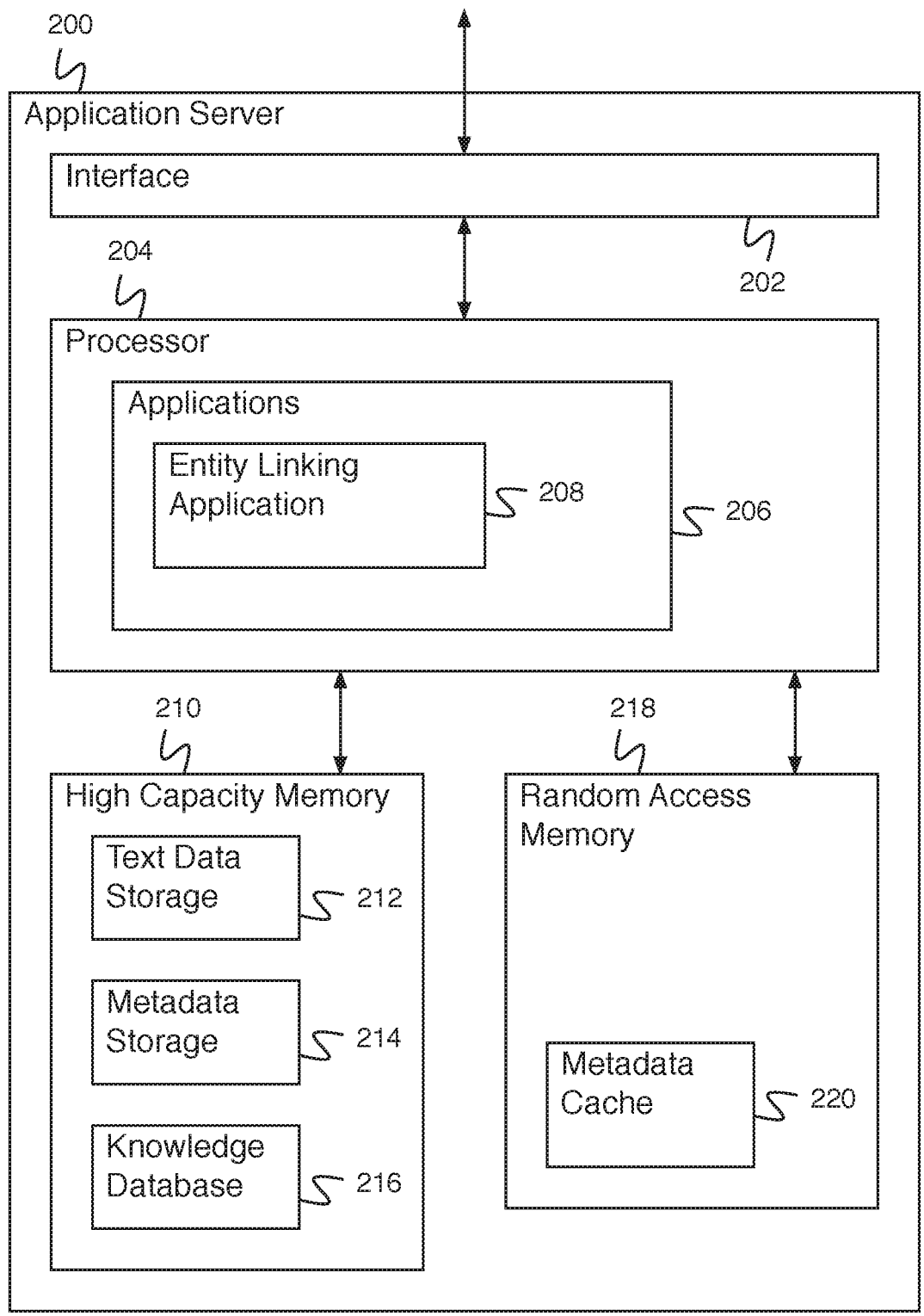
FIG. 2A is a block diagram illustrating an embodiment of an application server.
Figure 2B:
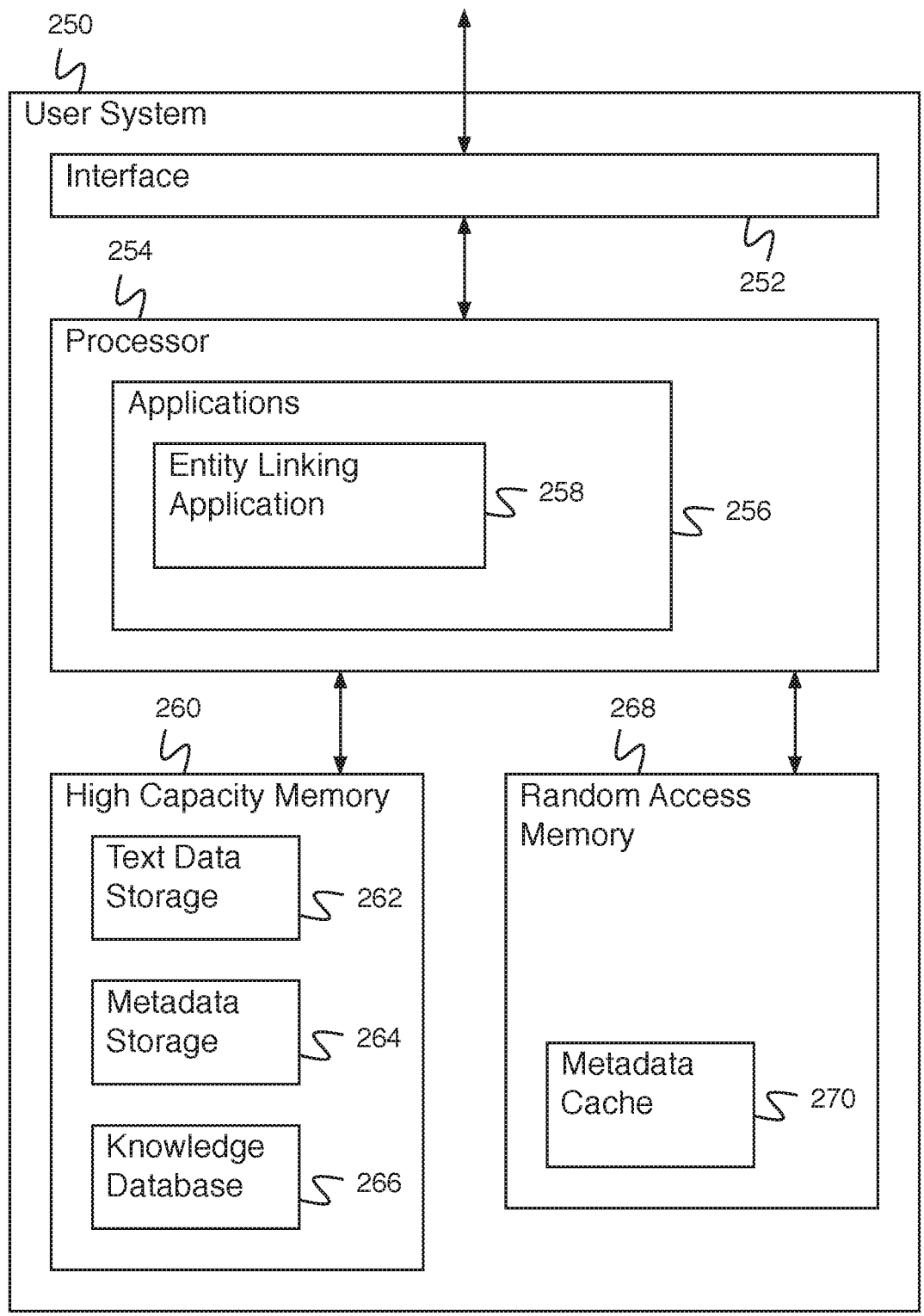
FIG. 2B is a block diagram illustrating an embodiment of a user system.

The entity linking application is either executed by an application server (as shown in FIG. 2A) or by a user system (as shown in FIG. 2B).

FIG. 2A is a block diagram illustrating an embodiment of an application server. In some embodiments, application server 200 comprises application server 104 of FIG. 1. In the example shown, application server 200 comprises interface 202. Interface 202 comprises an interface for communicating with external systems using a network. For example, interface 202 comprises an interface for communication with a user system (e.g., for receiving a request to execute an application, for providing a download of an application, etc.). Interface 202 additionally comprises an interface for receiving a set of words for disambiguation. Interface 202 receives a set of words for disambiguation from an external system, from high capacity memory 210, from random access memory 218, etc. Processor 204 comprises a processor for executing applications. Processor 204 comprises applications 206. For example, applications 206 comprises a communications application, a chat application, a web browser application, a document preparation application, a data analysis application, etc. Applications 206 includes entity linking application 208. Entity linking application 208 comprises an application for determining an entity associated with a text element. For example, entity linking application 208 comprises an application configured to determine a token from the set of words, wherein the token includes a subset of the set of words, determine candidates for the token, determine a ranking for the candidates based at least in part on a measure of the similarity between the semantic context in which the token appears and the target candidate, determine whether to select a top ranked candidate or to abstain, and in response to a select determination to select the top ranked candidate, indicate the top ranked candidate is selected. High capacity memory 210 comprises a high capacity memory (e.g., a hard drive, a flash drive, etc.) for storing data. High capacity memory 210 comprises text data storage 212 for storing text data (e.g., articles, books, chat logs, etc.). High capacity memory 210 additionally comprises metadata storage 214. Metadata storage 214 comprises a metadata storage for storing metadata (e.g., a candidate dictionary, metadata for determining tokens, metadata for a machine learning model, etc.). High capacity memory 210 additionally comprises knowledge database 216.

Knowledge database 216 comprises a knowledge database for storing a set of knowledge. In various embodiments, knowledge database 216 comprises a cached portion of an online encyclopedia, a client specific jargon database, a client specific database, a dictionary, a knowledge graph, a wiki, or any other appropriate database. In some embodiments, knowledge database 216 comprises a local copy of some or all of an external knowledge database.

Random access memory 218 comprises a random access memory (e.g., a memory for high speed access) for storing data. Random access memory 218 comprises metadata cache 220 for storing a cache of recently used metadata from the metadata store.

FIG. 2B is a block diagram illustrating an embodiment of a user system. In some embodiments, user system 250 comprises user system 106 of FIG. 1. In the example shown, user system 250 comprises interface 252. Interface 252 comprises an interface for communicating with external systems using a network. For example, interface 252 comprises an interface for communicating with another external system (e.g., using a chat app), an interface for communication with an application server (e.g., for requesting execution of an application, for requesting a download of an application, etc.). Interface 252 additionally comprises an interface for receiving a set of words for disambiguation. Interface 252 receives a set of words for disambiguation from an external system, from high capacity memory 260, from random access memory 268, etc. Processor 254 comprises a processor for executing applications. Processor 254 comprises applications 256. Applications 256 comprises a set of applications executed by processor 254. For example, applications 256 comprises a communications application, a chat application, a web browser application, a document preparation application, a data analysis application, etc. Applications 256 includes entity linking application 258. Entity linking application 258 comprises an application for determining an entity associated with a text element. For example, entity linking application 258 comprises an application configured to determine a token from the set of words, wherein the token includes a subset of the set of words, determine candidates for the token, determine a ranking for the candidates based at least in part on a measure of the similarity between the semantic context in which the token appears and the target candidate, determine whether to select a top ranked candidate or to abstain, and in response to a select determination to select the top ranked candidate, indicate the top ranked candidate is selected. High capacity memory 260 comprises a high capacity memory (e.g., a hard drive, a flash drive, etc.) for storing data. High capacity memory 260 comprises text data storage 262 for storing text data (e.g., articles, books, chat logs, etc.). High capacity memory 260 additionally comprises metadata storage 264. Metadata storage 264 comprises a metadata storage for storing metadata (e.g., a candidate dictionary, metadata for determining tokens, metadata for a machine learning model, etc.). High capacity memory 260 additionally comprises knowledge database 266.

Knowledge database 266 comprises a knowledge database for storing a set of knowledge. In various embodiments, knowledge database 266 comprises a cached portion of an online encyclopedia, an entire encyclopedia, a client specific jargon database, a company specific database, a dictionary, a knowledge graph, a wiki, or any other appropriate database. In some embodiments, knowledge database 266 comprises a local copy of some or all of an external knowledge database.

Random access memory 268 comprises a random access memory (e.g., a memory for high speed access) for storing data. Random access memory 268 comprises metadata cache 270 for storing a cache of recently used metadata from the metadata store.

Figure 3:
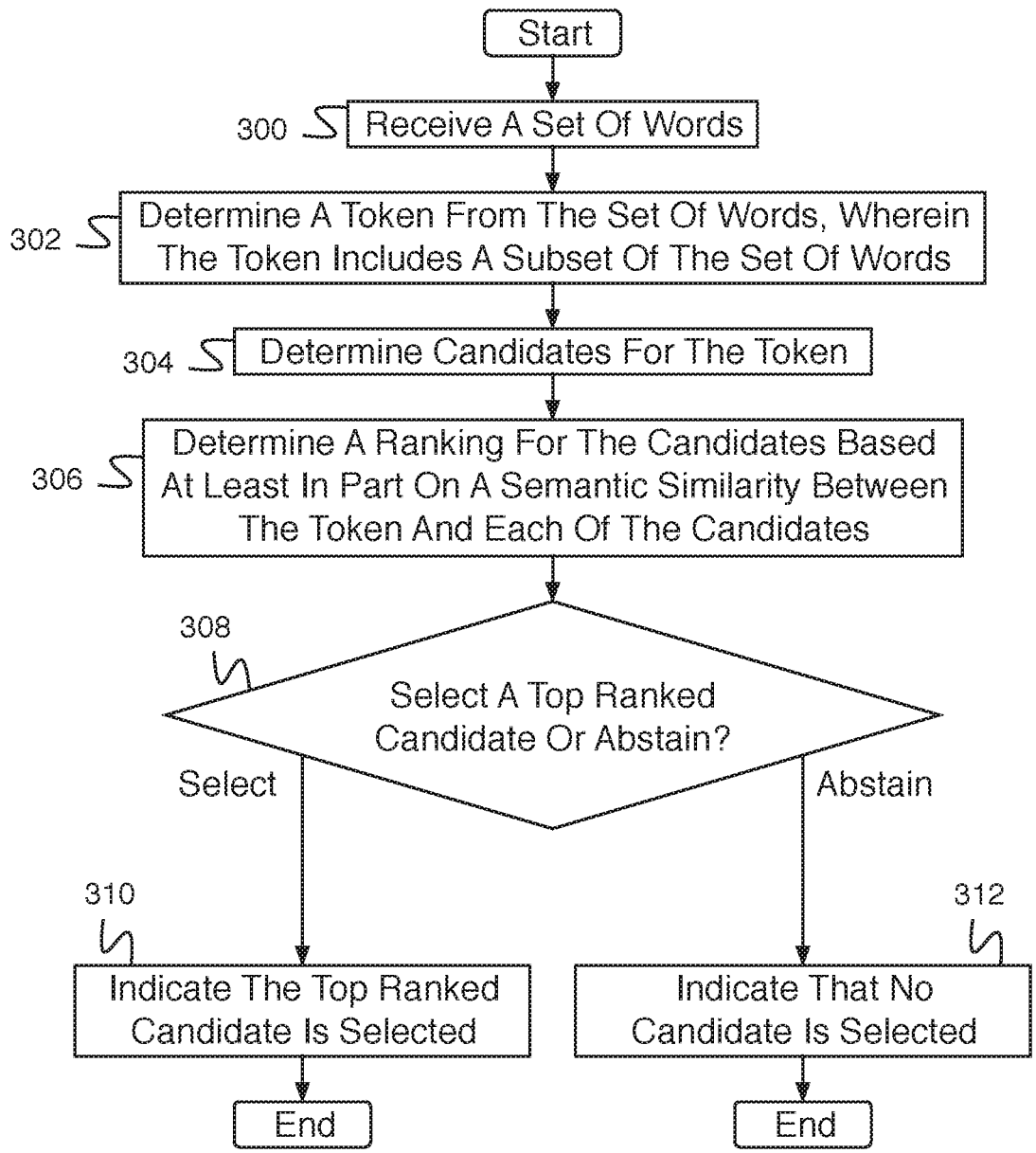
FIG. 3 is a flow diagram illustrating an embodiment of a process for disambiguation of noisy text.

FIG. 3 is a flow diagram illustrating an embodiment of a process for disambiguation of noisy text. In some embodiments, the process of FIG. 3 is executed by application server 200 of FIG. 2A or by user system 250 of FIG. 2B. In the example shown, in 300, a set of words is received. For example, a set of less-structured text—for example, from a chat session between employees. In 302, a token is determined from the set of words, wherein the token includes a subset of the set of words. For example, the set of words is grouped into a set of tokens and then each of the tokens is processed. In 304, candidates for the token are determined. For example, for each token a set of candidates is determined (e.g., Python might have candidates of 'programming language' or 'snake'). In 306, a ranking for the candidates is determined based at least in part on a measure of the similarity between the semantic context in which the token appears and the target candidate. In 308, it is determined whether to select a top ranked candidate or to abstain. In the event a select determination is made to select the top ranked candidate, control passes to 310. In 310, the process indicates that the top ranked candidate is selected, and the process ends. In the event it is determined in 308 that an abstain determination is made to abstain from selecting a candidate, control passes to 312. In 312, the process indicates that no candidate is selected.

Figure 4:
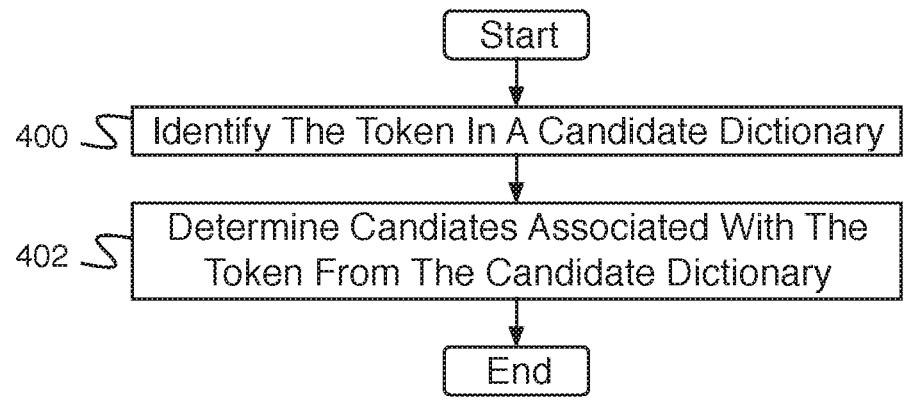
FIG. 4 is a flow diagram illustrating an embodiment of a process for determining candidates for a token.

FIG. 4 is a flow diagram illustrating an embodiment of a process for determining candidates for a token. In some embodiments, the process of FIG. 4 implements 304 of FIG. 3. In the example shown, in 400, the token is identified in a candidate dictionary. For example, identify matches or near matches within a candidate dictionary (e.g., python matches python—computer language and python—reptile/snake). In 402, candidates associated with the token are determined from the candidate dictionary. For example, the matches or near matches or likely matches (e.g., those above some determined similarity threshold) are selected to be candidates.

Figure 5:
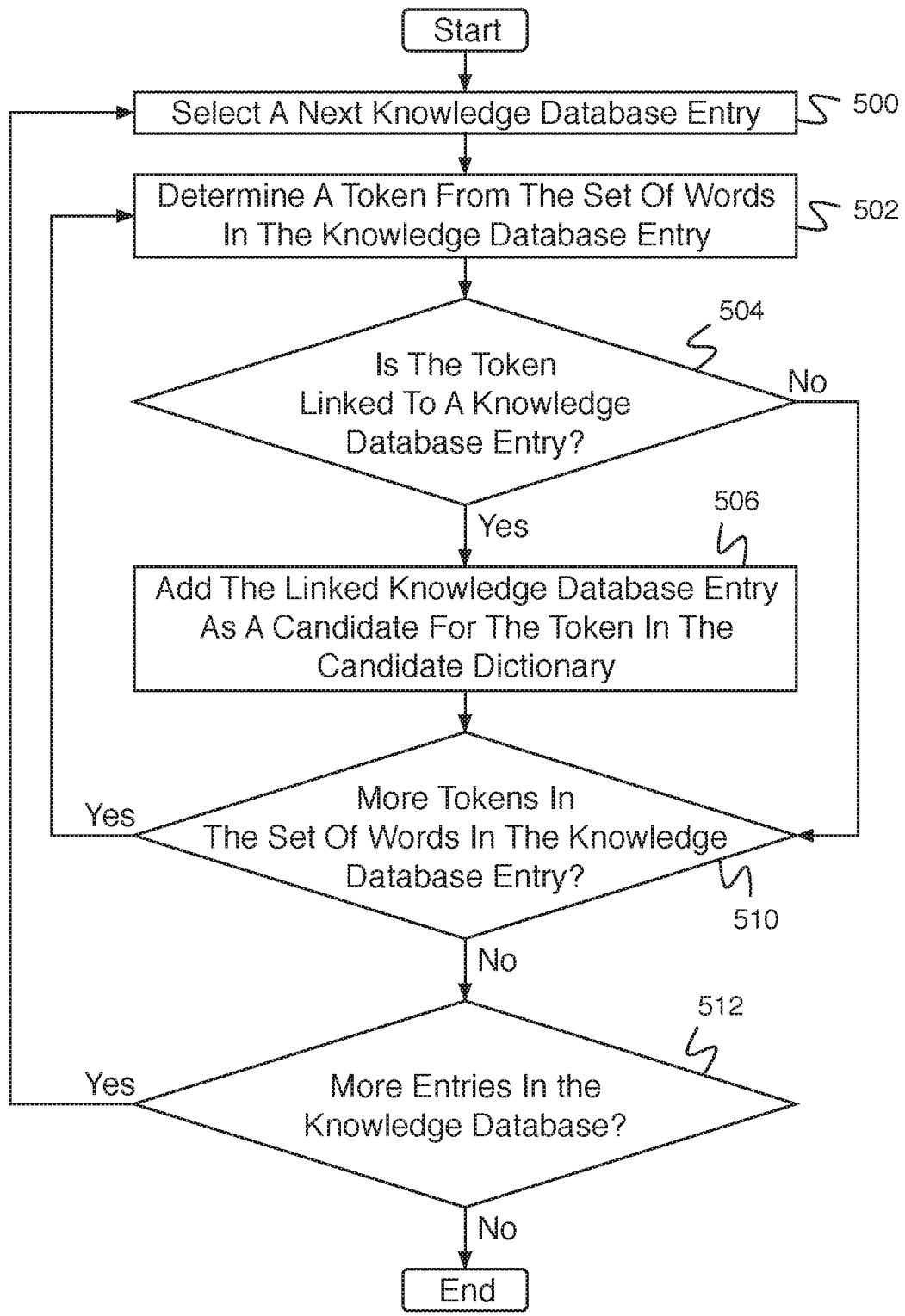
FIG. 5 is a flow diagram illustrating an embodiment of a process for creating a candidate dictionary.

FIG. 5 is a flow diagram illustrating an embodiment of a process for creating a candidate dictionary. In some embodiments, the process of FIG. 5 comprises a process for creating the candidate dictionary of FIG. 4. In 500, a next knowledge database entry is selected. In some embodiments, the next knowledge database entry comprises the first knowledge database entry. In various embodiments, the knowledge database entry comprises an online encyclopedia, a jargon database, a company specific database, a dictionary, a knowledge graph, a wiki (e.g., a repository with collaboratively maintained content), Wikipedia, a private jargon database, or any other appropriate database. In the example shown, in 502, a token is determined from the set of words in the knowledge database entry. In some embodiments, a tokenizing algorithm is used to determine a set of tokens from the knowledge database entry. In various embodiments, the token comprises the first token or the next token in the knowledge database entry. In 504 it is determined whether the token is linked to a knowledge database entry (e.g., the same knowledge database entry or a different knowledge database entry in the knowledge database). For example, there are many ways of generating a mapping from tokens to entries in a knowledge base. The algorithm may use hyperlinks that appear on webpages, relying on the anchor text of the hyperlink to indicate the relevant token and the target of the hyperlink to indicate the knowledge base entry to which the hyperlink points. Alternatively, the internal linking structure (as encoded in hyperlinks or other structured metadata) of the knowledge base itself may be used in a similar fashion. In some embodiments, it is determined whether the token exists in a list of hyperlinks of a knowledge database. In some embodiments, hyperlinks are manually annotated in the knowledge database (e.g., annotation by an editor) and indexed in a list associated with the knowledge database or a list is generated periodically by scanning the knowledge database. In the event it is determined that the token is not linked to a knowledge database entry, control passes to 510. In the event it is determined in 504 that the token is linked to a knowledge database entry, control passes to 506. In 506, the linked knowledge database entry is added to the candidate dictionary as a candidate for the token (e.g., the linked knowledge database entry is added to a list of candidates associated with the token). In 510, it is determined whether there are more tokens in the set of words in the knowledge database entry. In the event it is determined that there are more tokens in the set of words in the knowledge database entry, control passes to 502. In the event it is determined that there are not more tokens in the set of words in the knowledge database entry, control passes to 512. In 512, it is determined whether there are more entries in the knowledge database. In the event it is determined that there are more entries in the knowledge database, control passes to 500. In the event it is determined that there are not more entries in the knowledge database, the process ends.

Figure 6:
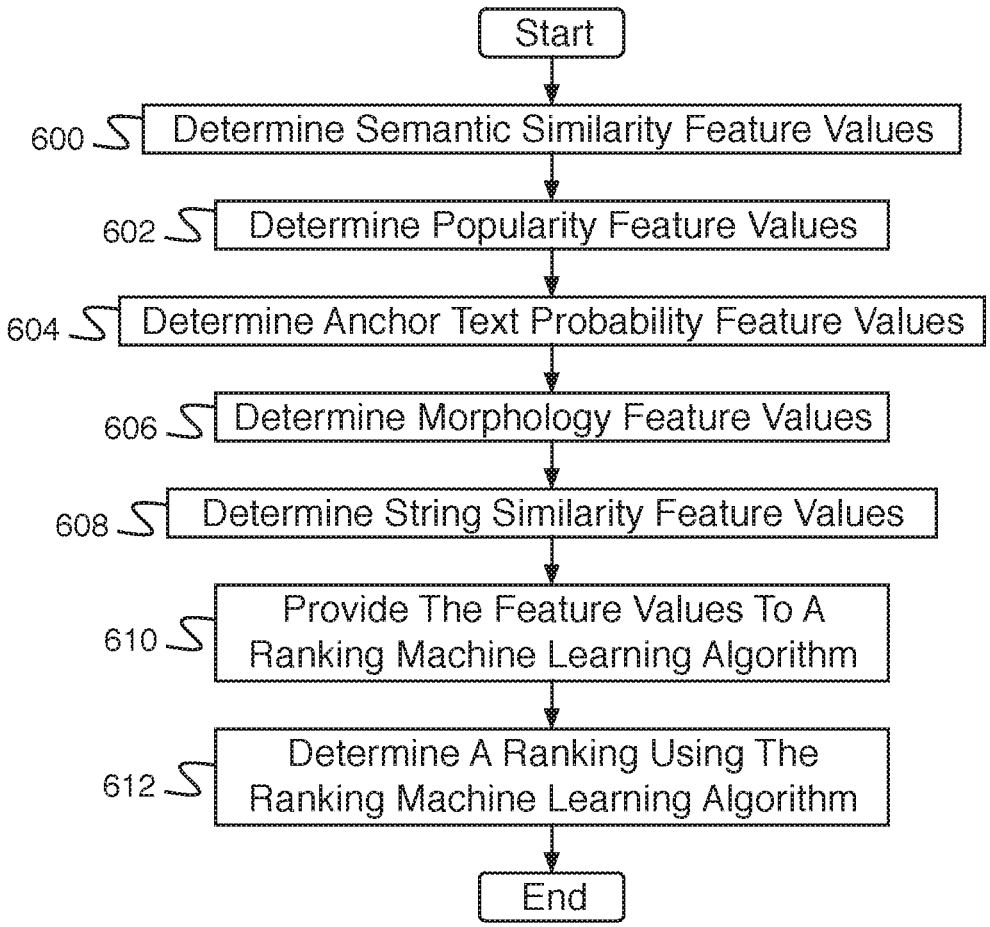
FIG. 6 is a flow diagram illustrating an embodiment of a process for determining a ranking for candidates based at least in part on a semantic similarity between a token and each of a set of candidates.

FIG. 6 is a flow diagram illustrating an embodiment of a process for determining a ranking for candidates based at least in part on a semantic similarity between a token and each of a set of candidates. In some embodiments, the process of FIG. 6 implements 306 of FIG. 3. In the example shown, in 600, semantic similarity feature values are determined. The measure of the similarity between the semantic context in which the token appears and the target candidate is based at least in part on one or more nearby words to token words in the set of words. In some embodiments, the word2vec or GloVe vector of the token and the embedding vector of the target candidate are used to understand how similar the two are as measured in terms of cosine similarity or Euclidean distance. In 602, popularity feature values are determined. In 604, anchor text probability feature values are determined. In 606, morphology feature values are determined. In 608, string similarity feature values are determined. In 610, the feature values are provided to a machine learning algorithm. In 612, a ranking is determined using the machine learning algorithm.

Figure 7:
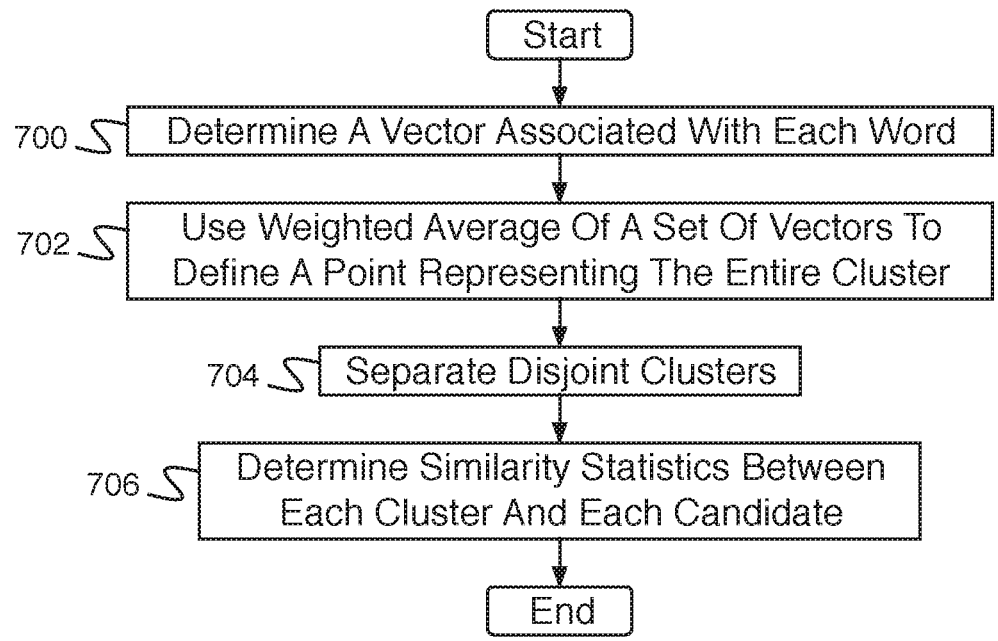
FIG. 7 is a flow diagram illustrating an embodiment of a process for determining semantic similarity feature values.

FIG. 7 is a flow diagram illustrating an embodiment of a process for determining semantic similarity feature values. In some embodiments, the process of FIG. 7 implements 600 of FIG. 6. In the example shown, in 700, a vector associated with each word in the noisy text is determined. The vector comprises a vector in a multidimensional vector space representing the meaning of the word. For example, the vector comprises a vector determined using a word2vec or a GloVe algorithm. In some embodiments, the vector is learned as a part of the model training. In 702, a weighted average of a set of vectors is used to define a point representing the entire cluster. Vectors are weighted by their relative frequency in the noisy text compared with their typical frequency in a text. The vector weighted clustering comprises a clustering of nearby words to a token word. The window size indicating which words are nearby words is determined. In some embodiments, the window size is optimized using cross-validation and random search over hyperparameters. In 704, disjoint clusters are separated. In some embodiments, words in the noisy or less-structured text that are semantically related are grouped using a nonparametric clustering algorithm that allows for multiple clusterings. In 706, similarity statistics between each cluster and each candidate are determined. For example, a similarity statistic between a cluster and a candidate comprises the distance or cosine similarity in the vector space between the cluster centroid and a vector associated with the candidate.

Figure 8:
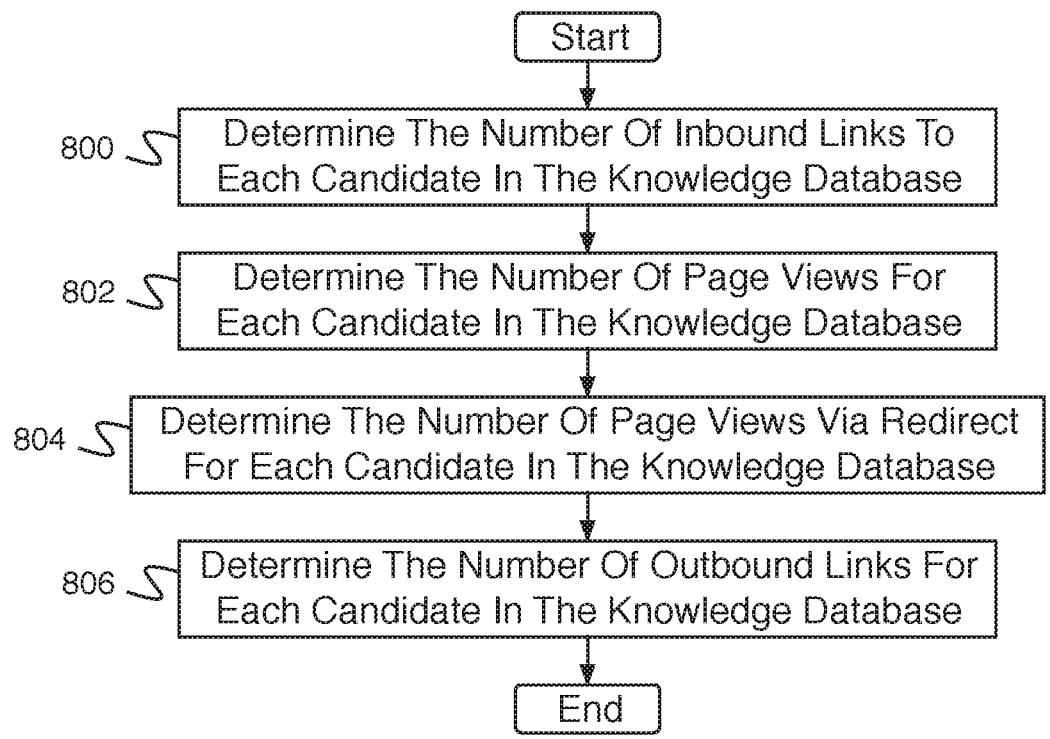
FIG. 8 is a flow diagram illustrating an embodiment of a process for determining popularity feature values.

FIG. 8 is a flow diagram illustrating an embodiment of a process for determining popularity feature values. In some embodiments, the process of FIG. 8 implements 602 of FIG. 6. In the example shown, in 800, the number of inbound links to each candidate in the knowledge database is determined. In 802, the number of page views for each candidate in the knowledge database is determined. In 804, the number of page views via redirect for each candidate in the knowledge database is determined. In 806, the number of outbound links for each candidate in the knowledge database is determined.

In various embodiments, popularity feature values are determined using pagerank or any other appropriate network centrality measure.

Figure 9:
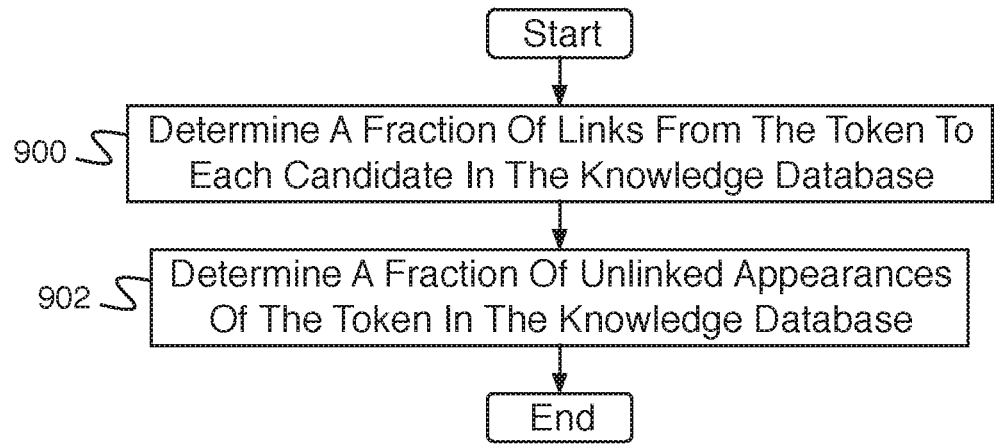
FIG. 9 is a flow diagram illustrating an embodiment of a process for determining anchor text probability feature values.

FIG. 9 is a flow diagram illustrating an embodiment of a process for determining anchor text probability feature values. In some embodiments, the process of FIG. 9 implements 604 of FIG. 6. In the example shown, in 900, a fraction of links from the token to each candidate in the knowledge database is determined. In 902, a fraction of unlinked appearances of the token in the knowledge database is determined.

Figure 10:
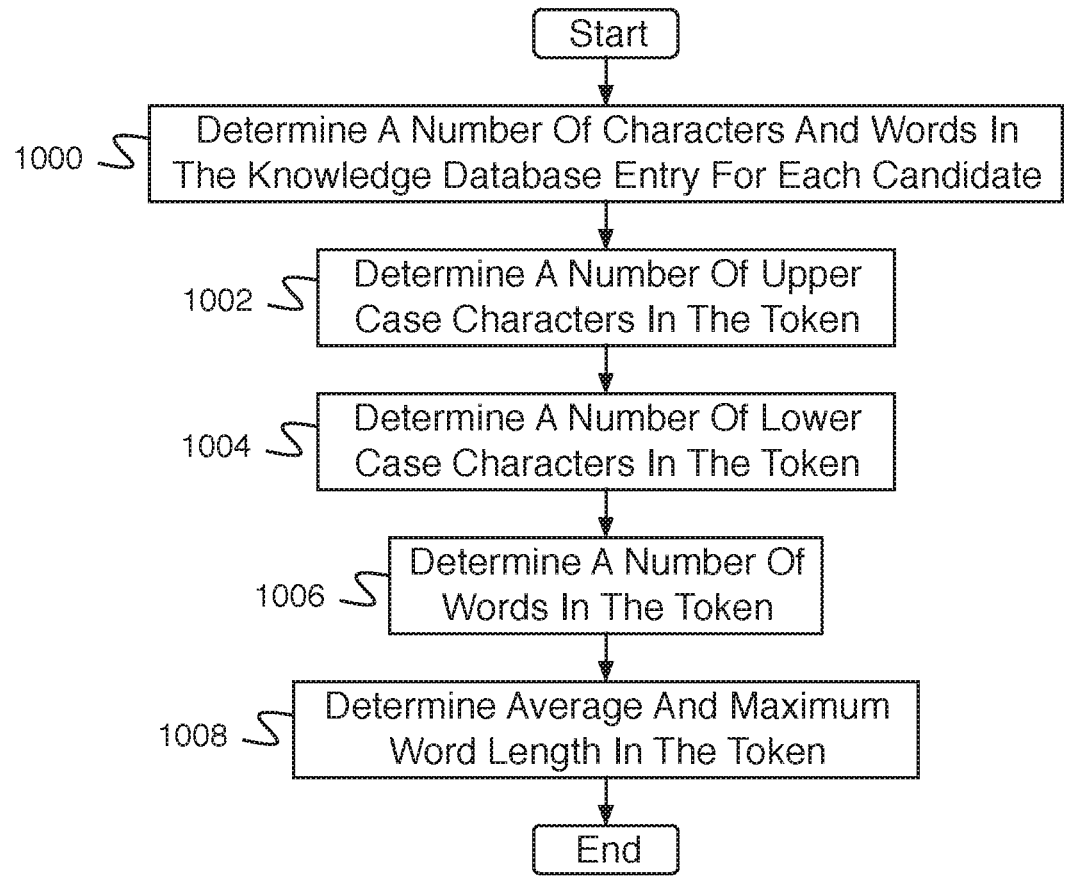
FIG. 10 is a flow diagram illustrating an embodiment of a process for determining morphology feature values.

FIG. 10 is a flow diagram illustrating an embodiment of a process for determining morphology feature values. In some embodiments, the process of FIG. 10 implements 606 of FIG. 6. In the example shown, in 1000, a number of characters and words in the knowledge database entry is determined for each candidate. In 1002, a number of upper case characters in the token is determined. In 1004, a number of lower case characters in the token is determined. In 1006, a number of words in the token is determined. In 1008, an average and a maximum word length in the token are determined.

Figure 11:
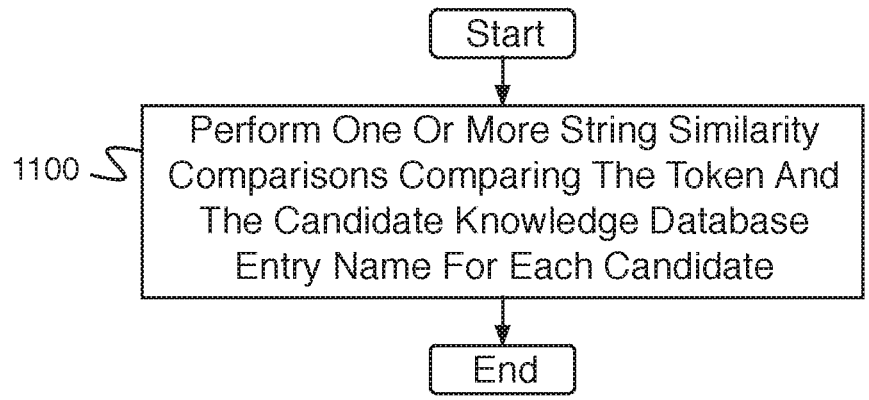
FIG. 11 is a flow diagram illustrating an embodiment of a process for determining string similarity feature values.

FIG. 11 is a flow diagram illustrating an embodiment of a process for determining string similarity feature values. In some embodiments, the process of FIG. 11 implements 608 of FIG. 6. In the example shown, in 1100, one or more string similarity comparisons comparing the token and the candidate knowledge database entry name for each candidate are performed.

Figure 12:
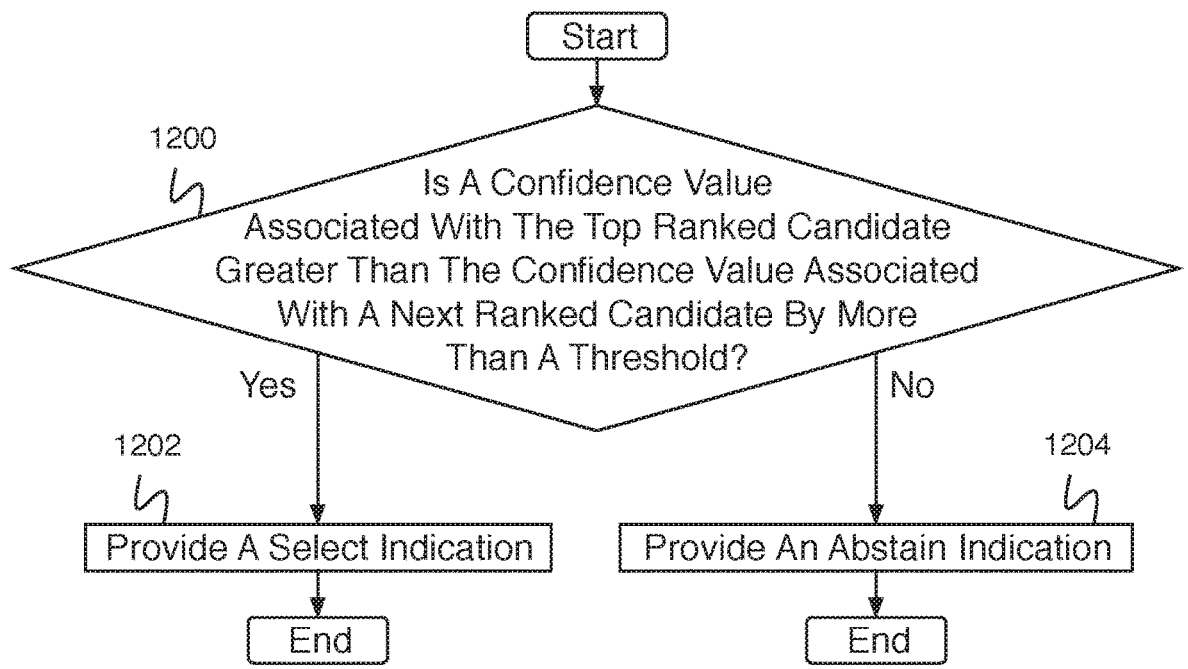
FIG. 12 is a flow diagram illustrating an embodiment of a process for determining whether to select a top ranked candidate or to abstain.

FIG. 12 is a flow diagram illustrating an embodiment of a process for determining whether to select a top ranked candidate or to abstain. In some embodiments, the process of FIG. 12 implements 308 of FIG. 3. In the example shown, in 1200, it is determined whether a confidence value associated with the top ranked candidate is greater than the confidence value associated with a next ranked candidate by more than a threshold. In the event it is determined that a confidence value associated with the top ranked candidate is greater than the confidence value associated with a next ranked candidate by more than a threshold, control passes to 1202. In 1202, a select indication is provided, and the process ends. In the event it is determined in 1200 that a confidence value associated with the top ranked candidate is not greater than the confidence value associated with a next ranked candidate by more than a threshold, control passes to 1204. In 1204, an abstain indication is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for disambiguation of noisy text, comprising:
an interface configured to receive a set of words from a supplied text and a processor configured to:
determine a token from the set of words, wherein the token includes a subset of the set of words;
determine candidates for the token, wherein the candidates comprise entities the token is linked with in a database;
determine a ranking for the candidates based at least in part on a measure of similarity between a semantic context in which the token appears and each of the candidates;
determine whether to select a top ranked candidate or to abstain, wherein the top ranked candidate is selected in response to determining that a confidence value associated with the top ranked candidate is greater than a confidence value associated with a next ranked candidate by more than a threshold; and
in response to determining to select the top ranked candidate, indicate the top ranked candidate is selected, wherein indicating the top ranked candidate is selected causes adding a hyperlink to the supplied text, wherein the hyperlink links to an entity in the database associated with the top ranked candidate.

2. The system of claim 1, wherein the subset of the set of words comprises one or more words.

3. The system of claim 1, wherein the subset of the set of words comprises words that are adjacent in the set of words.

4. The system of claim 1, wherein a set of tokens are determined from the set of words.

5. The system of claim 4, wherein the set of tokens is determined using a parallel method.

6. The system of claim 4, wherein the set of tokens is determined using a probabilistic method.

7. The system of claim 4, wherein the set of tokens include all the words of the set of words.

8. The system of claim 1, wherein the database comprises a knowledge database.

9. The system of claim 8, wherein the knowledge database comprises an online encyclopedia, a jargon database, or a company specific database.

10. The system of claim 1, wherein the measure of the similarity between the semantic context in which the token appears and a candidate of the candidates is based at least in part on one or more nearby words to token words in the set of words.

11. The system of claim 10, wherein the semantic similarity is based at least in part on a word clustering algorithm.

12. The system of claim 11, wherein the clustering algorithm comprises a cluster separation algorithm for separating disjoint clusters.

13. The system of claim 1, wherein the ranking for the candidates is additionally based on popularity, anchor text probabilities, morphology, or string similarity.

14. The system of claim 1, wherein determining the ranking for the candidates uses a machine learning algorithm.

15. The system of claim 14, wherein input features for the machine learning algorithm comprise semantic similarity values, popularity values, anchor text probability values, morphology values, or string similarity values.

16. The system of claim 1, wherein the processor is further configured to indicate that no candidate is selected in response to an abstain determination.

17. The system of claim 1, wherein the system further comprises:
- a high capacity memory configured to store a metadata store; and
- a random access memory configured to store a cache of recently used metadata from the metadata store.

18. A method for disambiguation of noisy text, comprising:
- receiving a set of words from a supplied text using an interface;
- determining, using a processor, a token from the set of words, wherein the token includes a subset of the set of words;
- determining candidates for the token, wherein the candidates comprise entities the token is linked with in a database;
- determining a ranking for the candidates based at least in part on a measure of similarity between a semantic context in which the token appears and each of the candidates;
- determining whether to select a top ranked candidate or to abstain, wherein the top ranked candidate is selected in response to determining that a confidence value associated with the top ranked candidate is greater than a confidence value associated with a next ranked candidate by more than a threshold; and
- in response to determining to select the top ranked candidate, indicating the top ranked candidate is selected, wherein indicating the top ranked candidate is selected causes adding a hyperlink to the supplied text, wherein the hyperlink links to an entity in the database associated with the top ranked candidate.

19. A computer program product for disambiguation of noisy text, the computer program product being embodied in a non-transitory computer readable storage medium and comprising computer instructions for:
- receiving a set of words from a supplied text; and
- determining a token from the set of words, wherein the token includes a subset of the set of words;
- determining candidates for the token, wherein the candidates comprise entities the token is linked with in a database;
- determining a ranking for the candidates based at least in part on a measure of similarity between a semantic context in which the token appears and each of the candidates;
- determining whether to select a top ranked candidate or to abstain, wherein the top ranked candidate is selected in response to determining that a confidence value associated with the top ranked candidate is greater than a confidence value associated with a next ranked candidate by more than a threshold; and
- in response to determining to select the top ranked candidate, indicating the top ranked candidate is selected, wherein indicating the top ranked candidate is selected causes adding a hyperlink to the supplied text, wherein the hyperlink links to an entity in the database associated with the top ranked candidate.

* * * * *